US009953755B2

(12) United States Patent
Barron et al.

(10) Patent No.: US 9,953,755 B2
(45) Date of Patent: Apr. 24, 2018

(54) CONTROLLABLE MAGNETORHEOLOGICAL FLUID TEMPERATURE CONTROL DEVICE

(71) Applicant: International Business Machines Corporation, Armonk, NY (US)

(72) Inventors: David Barron, Austin, TX (US); Chelsie M. Peterson, Dexter, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 14/833,223

(22) Filed: Aug. 24, 2015

(65) Prior Publication Data

US 2017/0038165 A1 Feb. 9, 2017

Related U.S. Application Data

(63) Continuation of application No. 14/818,733, filed on Aug. 5, 2015.

(51) Int. Cl.
*F25B 21/00* (2006.01)
*H01F 7/20* (2006.01)
(Continued)

(52) U.S. Cl.
CPC ................ *H01F 7/20* (2013.01); *F28F 13/00* (2013.01); *F28F 2013/001* (2013.01); *F28F 2013/008* (2013.01); *H01F 1/447* (2013.01)

(58) Field of Classification Search
CPC .......... F25F 13/00; B64G 1/50; H01L 23/473; F28D 15/00
(Continued)

(56) References Cited

U.S. PATENT DOCUMENTS 1,731,664 A * 10/1929 Hudd ........................ B61L 3/02 246/178
3,006,611 A 10/1961 Isham
(Continued)

FOREIGN PATENT DOCUMENTS

CN 101726212 A 6/2010
JP H05-248788 A 9/1993
(Continued)

OTHER PUBLICATIONS

IBM "List of IBM Patents or Patent Applications Treated as Related".
(Continued)

*Primary Examiner* — Melvin Jones
(74) *Attorney, Agent, or Firm* — Patterson + Sheridan, LLP

(57) ABSTRACT

Method for controlling heat transfer between two objects. In one embodiment, the method includes providing a first current through a first electromagnet disposed about a container holding magnetorheological fluid to generate a first magnetic field such that particles in the magnetorheological fluid align with the first magnetic field to conductively couple a first conductive element to a second conductive element; and providing a second current through a second electromagnet disposed perpendicular to the first electromagnet to generate a second magnetic field perpendicular to the first magnetic field such that the particles in the magnetorheological fluid align with the second magnetic field to conductively uncouple the first conductive member from the second conductive member.

7 Claims, 7 Drawing Sheets

(51) Int. Cl.
*F28F 13/00* (2006.01)
*H01F 1/44* (2006.01)

(58) Field of Classification Search
USPC ........................ 62/276, 104.28, 3.1; 165/276
See application file for complete search history.

(56) References Cited

U.S. PATENT DOCUMENTS

| | | | |
|---|---|---|---|
| 5,138,973 | A | 8/1992 | Davis et al. |
| 5,165,242 | A | 11/1992 | Chang |
| 5,247,800 | A | 9/1993 | Mruzek et al. |
| 5,248,636 | A | 9/1993 | Davis et al. |
| 7,628,198 | B2 | 12/2009 | Ouyang |
| 7,861,769 | B2 | 1/2011 | Ouyang |
| 7,886,816 | B2 | 2/2011 | Ouyang |
| 8,011,424 | B2 | 9/2011 | Murray |
| 8,336,611 | B2 | 12/2012 | Ouyang |
| 8,730,674 | B2 | 5/2014 | Dede et al. |
| 2003/0020463 | A1 | 1/2003 | Carlson et al. |
| 2003/0041600 | A1 | 3/2003 | van den Berg et al. |
| 2004/0210289 | A1 | 10/2004 | Wang et al. |
| 2005/0079132 | A1 | 4/2005 | Wang et al. |
| 2006/0081413 | A1* | 4/2006 | Minto ...................... G01V 1/52 181/111 |
| 2006/0210410 | A1* | 9/2006 | Mokler ................. F04B 17/046 417/416 |
| 2009/0218087 | A1 | 9/2009 | Oshima |
| 2009/0277608 | A1 | 11/2009 | Kamins et al. |
| 2011/0297394 | A1 | 12/2011 | VanDelden |
| 2014/0208731 | A1 | 7/2014 | Shepherd et al. |
| 2017/0038166 | A1 | 2/2017 | Barron et al. |

FOREIGN PATENT DOCUMENTS

| | | | |
|---|---|---|---|
| JP | 3081295 | U | 10/2001 |
| JP | 2003-232596 | A | 8/2003 |
| JP | 2013-245840 | A | 12/2013 |

OTHER PUBLICATIONS

U.S. Patent Application entitled Controllable Magnetorheological Fluid Temperature Control Device, filed Aug. 5, 2015.

* cited by examiner

CONTROLLABLE MAGNETORHEOLOGICAL FLUID TEMPERATURE CONTROL DEVICE

CROSS-REFERENCE TO RELATED APPLICATIONS

This application is a continuation of co-pending U.S. patent application Ser. No. 14/818,733, filed Aug. 5, 2015, which is related to U.S. patent application Ser. No. 14/818,722, titled "Controllable Magnetorheological Fluid Temperature Control Device," filed Aug. 5, 2015. The aforementioned related patent applications are herein incorporated by reference in their entirety.

BACKGROUND

The present invention relates to a method and apparatus to control heat transfer between two objects, and more specifically, a method and apparatus to control heat transfer using a system of manipulating magnetorheological fluid.

Electronic devices perform tasks, which are becoming more complicated and computationally intensive with each passing year. In response to the requirements placed on these electronic devices, semiconductor die need to perform at ever-increasing levels of performance. To provide the increased performance, successive generations of electronic devices include semiconductor die having smaller design rules which enable higher data speeds with the tradeoff of generating more heat in successively smaller spatial volumes. Further, as semiconductor die to the larger electrical device becomes more densely packed. This dense interconnection circuitry may become a physical obstacle to remove heat from the semiconductor die and contributes to the heat generated by the electrical device. Heat is often removed from the electrical device as materials making up the electrical device may be altered by temperatures above a certain threshold and these temperatures may adversely change electrical characteristics of the materials. For example, power leakage through transistors on logic circuitry may occur as the temperature is increased and data integrity issues may occur when memory cells are exposed to temperatures outside their operating range. Also, removing heat may reduce extreme temperature fluctuations in the electrical device, which can damage components through expansion and contraction when power is cycled on and off.

Conventional heat transfer approaches for semiconductor die include passive air convection, forced air conduction, and/or thermal sinks. However, these approaches are becoming less effective given the greater amounts of heat being generated in reduced spatial volumes. A known inefficiency in server and other electronic cooling is the underutilization of heat sinks based on chip usage. For example, when one processor is being used at fully capacity and another adjacent processor is not being used, the heat sink volume of the unused processor is being wasted.

Thus, an apparatus and method for heat to be transferred between two objects when desired are needed.

SUMMARY

According to one embodiment, a method for controlling heat transfer is disclosed herein. The method includes providing a first current through a first electromagnet disposed about a container holding magnetorheological fluid to generate a first magnetic field such that particles in the magnetorheological fluid align with the first magnetic field to conductively couple a first conductive element to a second conductive element and providing a second current through a second electromagnet disposed perpendicular to the first electromagnet to generate a second magnetic field perpendicular to the first magnetic field such that the particles in the magnetorheological fluid align with the second magnetic field to conductively uncouple the first conductive member from the second conductive member.

DETAILED DESCRIPTION

Figure 1A:
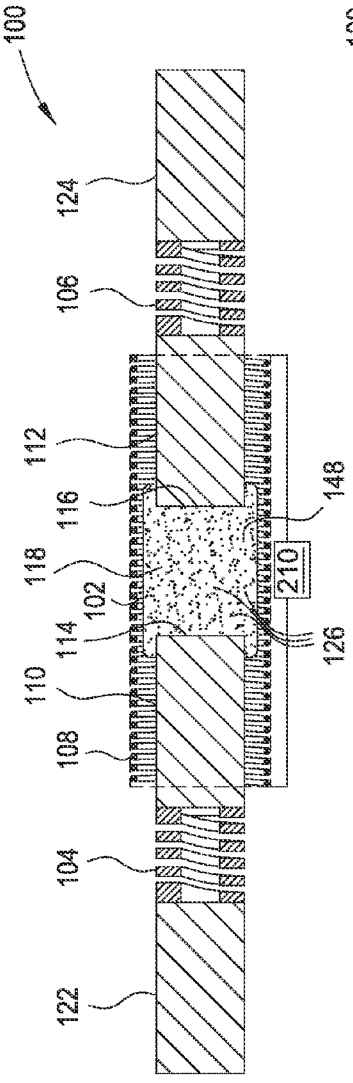
FIGS. 1A-1C illustrate one embodiment of a temperature control device during different stages of a current being supplied therein.

FIG. 1A illustrates one embodiment of a temperature control device 100 to control heat transfer between two objects. The temperature control device 100 may include a container 102, at least one biasing element, an electromagnet 108, and a plurality of conductive elements 110, 112. The container 102 includes a first end 114 and a second end 116. The first conductive element 110 is disposed at the first end 114 of the container 102. The second conductive element 112 is disposed at the second end 116 of the container 102. In some embodiments, the first and second conductive elements 110, 112 impinge on the container 102.

In one embodiment, the temperature control device 100 includes a first biasing element 104 and a second biasing element 106. While embodiments of the present disclosure are described having two biasing elements, it is noted that other embodiments may include any number of biasing elements in a variety of configurations and arrangements, such as more than two biasing elements, only one biasing elements, or even no biasing elements. The first biasing element 104 is coupled to the first conductive element 110. The first biasing element 104 is configured to move the first conductive element 110 relative to the container 102. The second biasing element 106 is coupled to the second conductive element 112. The second biasing element 106 is configured to move the second conductive element 112 relative to the container 102. In the embodiment shown in FIG. 1, the first and second biasing elements 104, 106 are coaxial with the first and second conductive elements 110, 112. The temperature control device 100 may further include a third conductive element 122 and a fourth conductive element 124. The third conductive element 122 may be coupled to the first biasing element 104, opposite the first conductive element 110. The fourth conductive element 124 may be coupled to the second biasing element 106, opposite the second conductive element 112. The first conductive element 110, the first biasing element 104, the second conductive member 112, and the second biasing member 106 form compliant sections that permit the ends 114, 116 to move closer together.

The electromagnet 108 is disposed about the container 102. In one embodiment, the electromagnet 108 may be a solenoid disposed around the container 102, although other embodiments are possible. The electromagnet 108 is coupled to a controller 120. The controller 120 is configured to provide a current through to the electromagnet 108 to generate a magnetic field about the container 102. For example, the generated magnetic field may be parallel to the container 102.

The container 102 may contain a fluid 118. The fluid 118 may be a magnetorheological fluid (MR fluid) 118. The MR fluid 118 contains a plurality of ferromagnetic particles 126. Initially, the particles 126 are randomly distributed throughout the MR fluid. The particles 126 are configured to align with magnetic flux lines of a magnetic field when a magnetic field is generated about the container 102. The alignment of the particles 126 is configured to conductively couple the first conductive element 110 to the second conductive element 112 such that heat may be transferred through the temperature control device 100. For example, when the power source 120 provides a current to the electromagnet 108 to generate a magnetic field about the container with magnetic flux lines parallel to the container, the particles 126 in the MR fluid 118 will align with the magnetic flux lines in a parallel arrangement to conductively couple the first conductive element 110 to the second conductive element 112. The container 102 may be a flexible container that is configured to be constricted responsive to movement of the first conductive element 110 and the second conductive element 112 against the first end 114 and the second end 116, respectively.

In the embodiment shown in FIG. 1A, the biasing elements 104, 106 are in a relaxed initial position. The biasing elements 104, 106 are in the relaxed positions because no current is provided to the electromagnet 108. When no current is provided to the electromagnet 108, particles 126 in the MR fluid 118 are not aligned. Thus, the first conductive element 110 is not conductively coupled with the second conductive element 112.

Figure 1B:
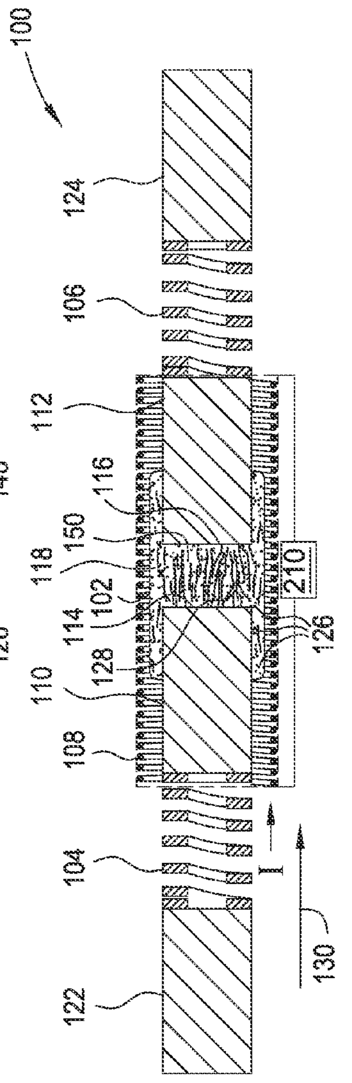

FIG. 1B illustrates one embodiment of the temperature control device 100 when a current, I, is provided to the electromagnet 108. In operation, the controller 120 provides a current, I, to the electromagnet 108. Responsive to providing current I to the electromagnet 108, a magnetic field is generated within the container 102.

Figure 2:
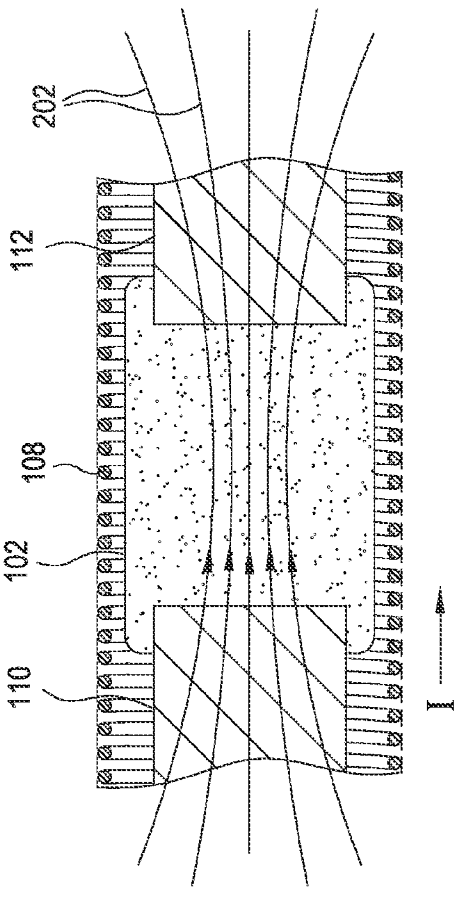
FIG. 2 illustrates one embodiment of the magnetic flux lines generated through the temperature control device of FIGS. 1A-1C.

FIG. 2 shows an enlarged view of the container 102 of the temperature control device 100 depicting the magnetic field. The magnetic field generated within the container 102 contains flux lines 202 parallel to the container 102. The particles 126 in the MR fluid 118 align with the flux lines 202 to create a parallel arrangement of particles 126. The alignment of the particles 126 in the direction of the magnetic field increases the heat transfer in the axial direction due to the different in thermal conductivity of the MR fluid 118.

Referring back to FIG. 1B, the magnetic field pulls the first biasing element 104 towards the first end 114 of the container 102 and the second biasing element 106 towards the second end 116 of the container 102. As a result, the first biasing element 104 biases the first conductive element towards the first end 114 of the container 102 and the second biasing element 106 biases the second conductive element towards the second end 116 of the container 102. The biasing of the conductive elements 110, 112 constricts the flexible container 102. Constricting the flexible container 102 reduces an initial area 148 of the flexible container 102 between the first conductive element 110 and the second conductive element 112. A reduced area 150 results in an increased concentration of particles 126 in the MR fluid 118.

The magnetic field generated by the electromagnet 108 influences the particles 126 to align with the magnetic flux lines. The magnetic field, in addition to the reduced area 150, creates a plurality of chains 128 of particles 126 in the MR fluid 118. The chains 128 are aligned with the magnetic flux lines, parallel to the container 102, and coaxial to the conductive elements 110, 112. The chains 128 conductively couple the first conductive element 110 to the second conductive element 112. By conductively coupling the first conductive element 110 to the second conductive element 112, heat is transferred through the temperature control device 100. For example, heat may be transferred in the direction illustrated by line 130. In FIG. 1B, the rate of heat transfer is not at its maximum. As illustrated, a plurality of particles 126 remain scattered in the MR fluid 118 because only moderate current is provided to the electromagnet 108.

Figure 1C:
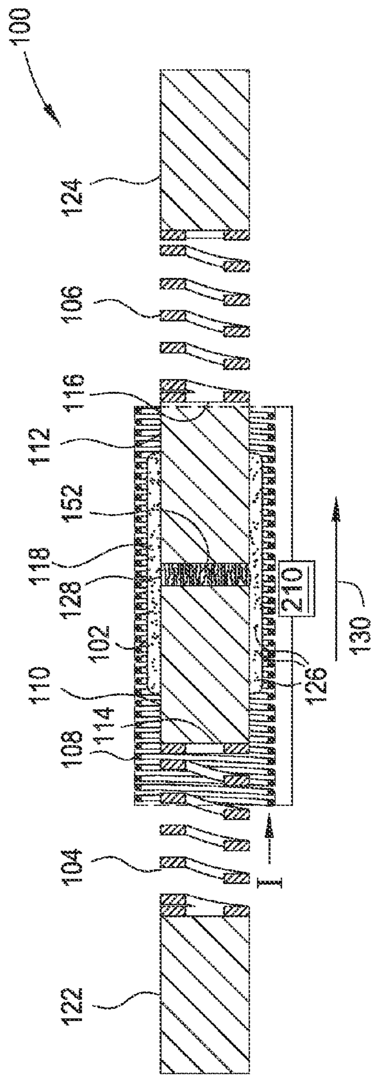

FIG. 1C illustrates the temperature control device 100 according to one embodiment. In FIG. 1C, maximum current is provided to the electromagnet 108. The maximum current increases the strength of the generated magnetic field. The increased magnetic field pulls the first biasing element 104 further towards the first end 114 of the container 102 and the second biasing element 106 further towards the second end 116 of the container 102. The first biasing element 104 biases the first conductive element 110 further towards the first end 114 of the container 102 and the second biasing element 106 biases the second conductive element 112 further towards the second end 116 of the container 102. The additional biasing of the conductive elements towards the ends 114, 116, respectively, further constricts the flexible container 102. Further constricting the flexible container 102 reduces the area 150 of the flexible container to an area 152. The reduced area 152 results in a larger concentration of particles 126 in the MR fluid 118 as compared to the concentration of particles 126 in the MR fluid 118 in areas 148, 150.

The increased magnetic field generated by the electromagnet 108 influences more particles 126 to align with the magnetic flux lines. The magnetic field, in addition to the reduced area 152, creates a greater plurality of chains 128 of particles 126 in the MR fluid 118. The increased number of chains 128 increases the conductive coupling between the first conductive element 110 and the second conductive element 112. At maximum current, heat transfer is at its greatest and the number of particles 126 scattered is minimized.

The current provided to the electromagnet 108 may be reduced to decrease the rate of heat transfer through the temperature control device 100. Reducing the current through the electromagnet 108 reduces the strength of the magnetic field. The first and second biasing elements 104, 106 begin to relax when the strength of the magnetic field is reduced. The first conductive element 110 and the second conductive element 112 move back to the initial positions. The container 102 expands, thus increasing the reduced area 152 back to the initial area 148. The expansion of the container 102 breaks the chains 128 of particles 126 in the MR fluid 118. The rate of heat transfer through the temperature control device 100 is decreased because breaking the chains of particles 126 in the MR fluid conductively uncouples the first conductive element 110 from the second conductive element 112. To stop heat transfer through the temperature control device 100, the power source 120 provides no current to the electromagnet 108 resulting in the biasing elements 104, 106 moving back to an initial relaxed position and the reduced area 152 of the container 102 expanding back to the initial area 148, and returns to the state depicted in FIG. 1A.

The embodiments shown in FIGS. 1A-1C illustrate a certain level of displacement between the conductive elements via the biasing elements. However, those skilled in the art will appreciate that in another embodiment, it may be preferred to accept a lower maximum displacement. This may be done by including only one biasing element.

Figure 3:
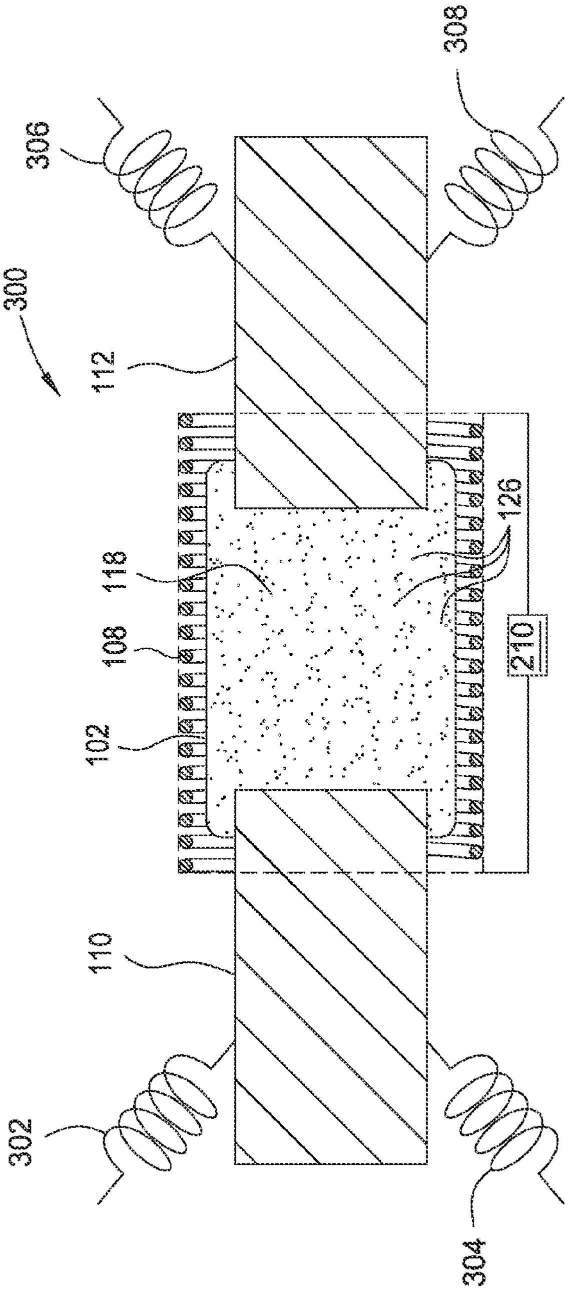
FIG. 3 illustrates another embodiment of a temperature control device, as disclosed herein.

FIG. 3 illustrates another embodiment of a temperature control device 300. It should be understood that other configurations of the temperature control device may be utilized. For Example, FIG. 3 illustrates another embodiment of the temperature control device wherein the biasing elements need not be axially aligned with the conductive member 110, 112. The temperature control device 300 includes a plurality of biasing elements 302, 304, 306, 308. The first biasing element 302 and the second biasing element 304 are coupled to the first conductive element 110. The biasing elements 302, 304 are not axially aligned with the conductive element 110. The third biasing element 306 and the fourth biasing element 308 are coupled to the second conductive element 112. The biasing elements 306, 308 are not axially aligned with the conductive element 112. The biasing elements 302, 304 are configured to bias the first conductive element 110 relative to the container 102. The biasing elements 306, 308 are configured to bias the second conductive element 112 relative to the container 102.

Figure 4:
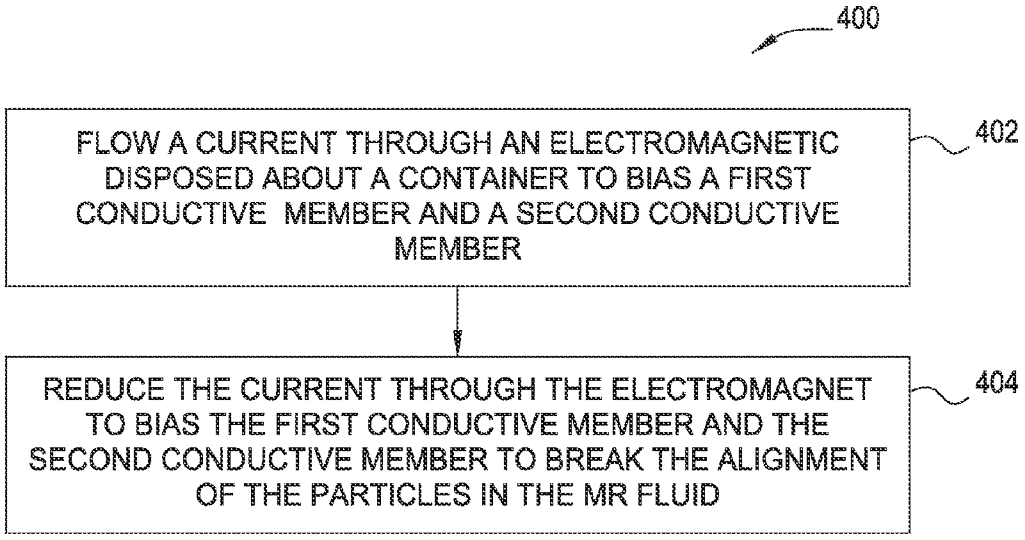
FIG. 4 illustrates a method of controlling temperature using the temperature control device of FIGS. 1A-1C, according to one embodiment.

FIG. 4 illustrates a method 400 of transferring heat through a temperature control device, such as the temperature control device of FIGS. 1A-1C. The method begins at block 402. At block 402, a controller provides a current to an electromagnet disposed around a container containing MF fluid. The electromagnet generates a magnetic field about the container. The magnetic field causes a first biasing element to bias a first conductive element positioned on one end of the container towards the container, and a second biasing element to bias a second conductive element positioned on a second end of the container towards the container. The movement of the first conductive element and the second conductive element constricts the container. Particles in the MR fluid align themselves with the magnetic flux lines in the magnetic field to form chains of particles. The constriction of the container increases the concentration of the chains in the MR fluid. The alignment of the particles conductively couples the first conductive element to the second conductive element. The conductive coupling allows heat to transfer through the temperature control device. The amount of heat transfer may be controlled by adjusting the current provided to the electromagnet.

At block 404, the current provided to the electromagnet is reduced to reduce heat transfer through the temperature control device. Reducing the current weakens the strength of the magnetic field about the container. The decreased strength results in the biasing elements biasing the first and second conductive elements away from the container. The concentration of chains of particles in the MR fluid is reduced due to the reduction in magnetic flux lines and the expansion of the container holding the MR fluid. The amount of heat transferred through the temperature control device may be reduced to zero if current is no longer provided to the electromagnet. When current is no longer applied to the electromagnet, the first and second conductive elements are moved back to their initial positions. Additionally, the chains of particles in the MR fluid are broken, and the particles are randomly scattered. As such, there is no longer a conductive coupling between the first and second conductive elements.

Blocks 402-404 may be repeated to vary the amount of heat transferred through the temperature control device.

Figure 5A:
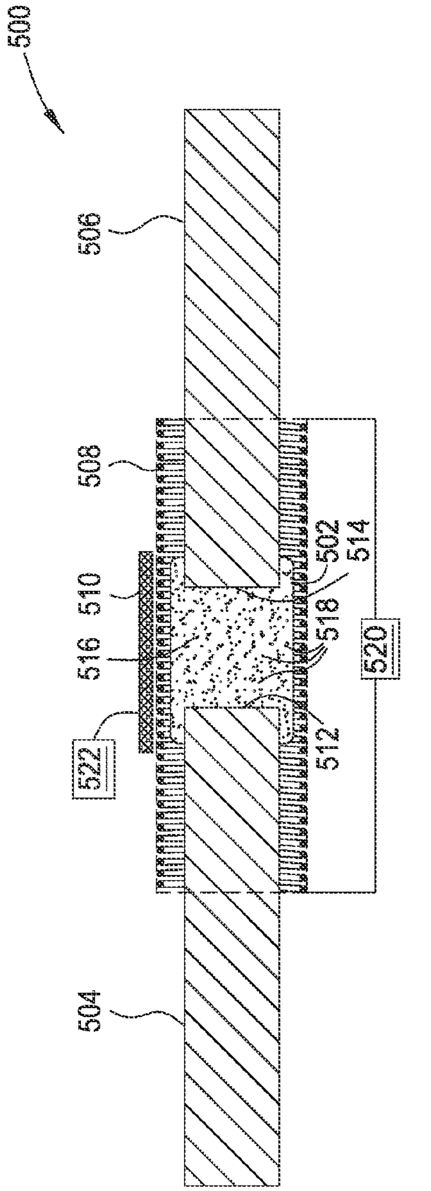
FIGS. 5A-5D illustrate one embodiment of a temperature control device during different stages of a current being supplied therein.

FIG. 5A illustrates one embodiment of a temperature control device 500 to control heat transfer between two objects. The temperature control device 500 may include a container 502, a plurality of conductive elements 504, 506, a first electromagnet 508, and second electromagnet 510. The container 502 includes a first end 512 and a second end 514. The first conductive element 504 is disposed at the first end 512 of the container 502. The second conductive element 506 is disposed at the second end 514 of the container 502.

The electromagnet 508 is disposed about the container 502. The electromagnet 508 may be, for example, a solenoid disposed about the container 502. The electromagnet 508 is coupled to a controller 520. The power source 520 is configured to provide a first current to the electromagnet 508 to generate a magnetic field about the container 502. For example, the generated magnetic field may be parallel to the container 502.

The container 502 may be a flexible container that is configured to be constricted responsive to movement of the first conductive element 504 and the second conductive element 506 against the first end 512 and the second end 514, respectively. The container 502 may contain a fluid 516. For example, the fluid 516 may be an MR fluid. The MR fluid 516 contains a plurality of particles 518. The particles 518 may be magnetic. Initially, the particles 518 are randomly distributed through the fluid 516. The particles 518 are configured to align with magnetic flux lines of a magnetic field when the magnetic field is generated about the container 502. The alignment of the particles 518 is configured to conductively couple the first conductive element 504 and the second conductive element 506 such that heat may be transferred through the temperature control device 500. For example, when the power source 520 provides a current to the electromagnet 508 to generate a magnetic field about the container with magnetic flux lines parallel to the container, the particles 518 in the MR fluid 516 will align with the magnetic flux lines in a parallel arrangement to conductively couple the first conductive element 504 to the second conductive element 506.

The second electromagnet 510 is positioned perpendicular to the electromagnet 508. In the embodiment shown in FIG. 5, the second electromagnet 510 is positioned above the electromagnet 508. The second electromagnet 510 is coupled to the controller 520. The controller 520 is configured to provide a current through the second electromagnet 510 such that a magnetic field is generated. The magnetic field generated by the second electromagnet 510 is orthogonal to the magnetic field generated by the electromagnet 508. In one embodiment, the second electromagnet 510 may be replaced with a permanent magnet.

In the embodiment shown in FIG. 5A, a current has not been provided to the electromagnet 508. When no current is provided to the electromagnet 508, the particles 518 in the MR fluid 516 are randomly scattered and not aligned. Thus, the first conductive element 504 is not conductively coupled with the second conductive element 506. As such, heat cannot be transferred through the temperature control device 500.

Figure 5B:
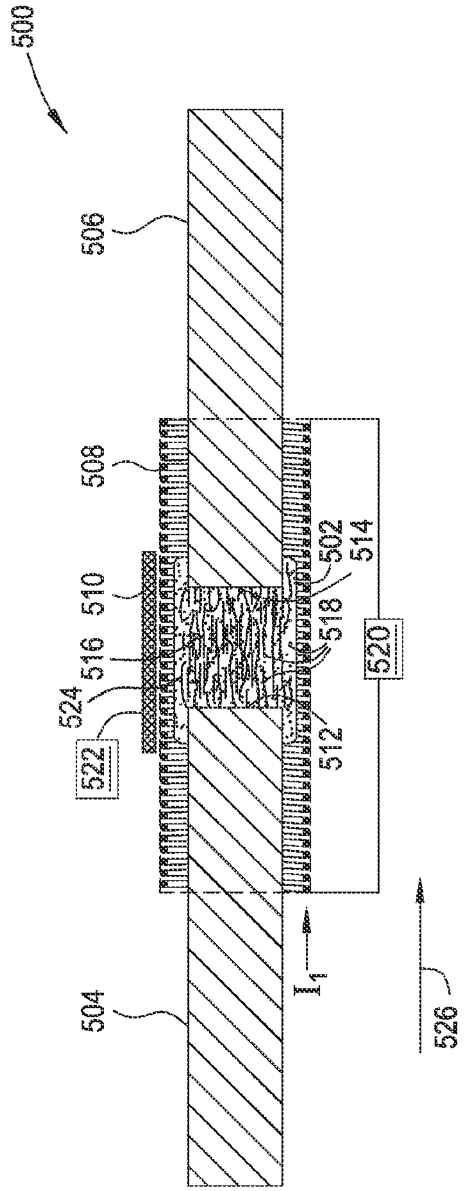

FIG. 5B illustrates one embodiment of the temperature control device 500 when a current, I1, is provided to the electromagnet 508. The power source 520 provides the current I1 to the electromagnet 508. Responsive to providing a current to the electromagnet 508, a magnetic field is generated through the electromagnet 508.

Figure 6:
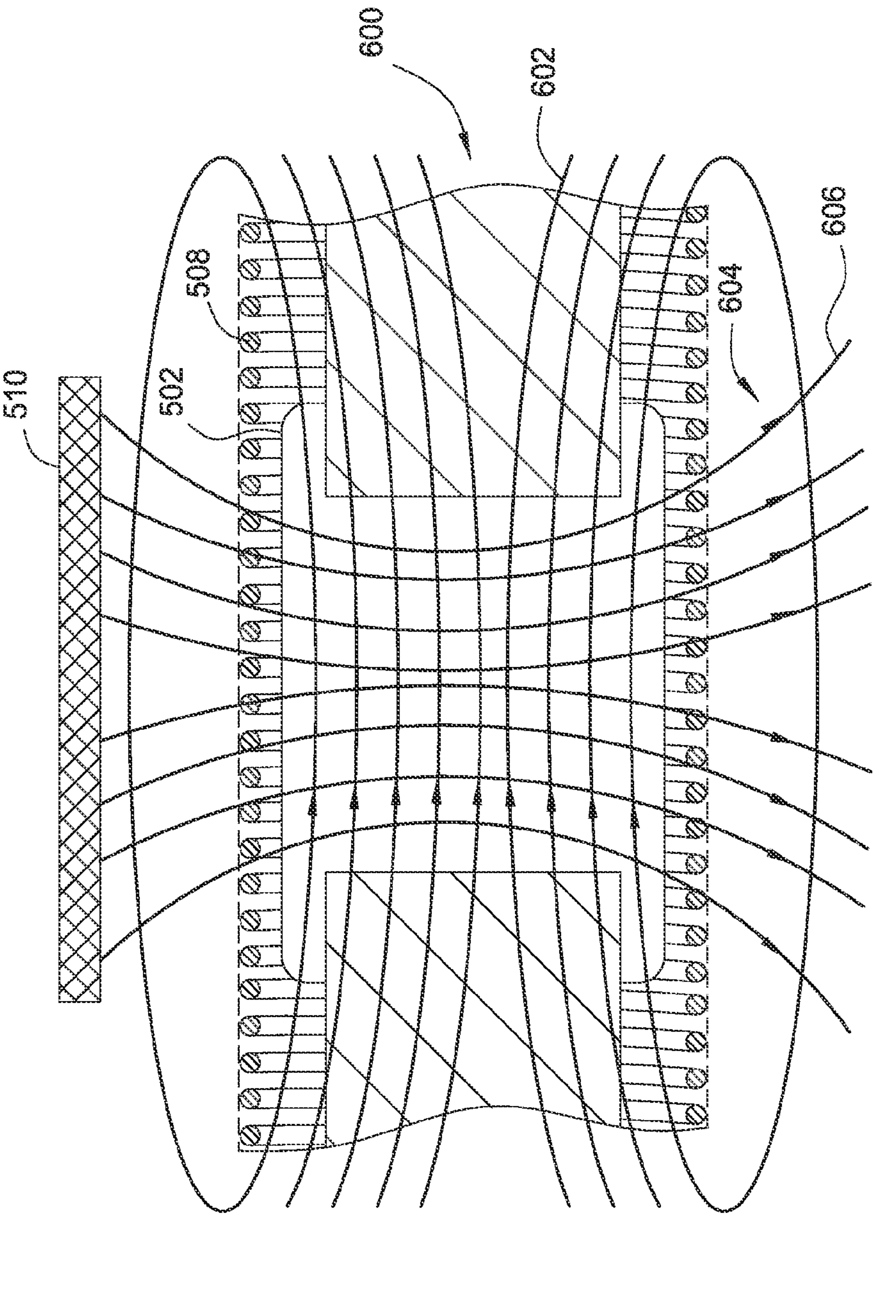
FIG. 6 illustrates one embodiment of the magnetic flux lines generated by the first electromagnet and the second electromagnet of the temperature control device illustrated in FIGS. 5A-5D.

FIG. 6 shows an enlarged view of the container 502 of the temperature control device 500 depicting the first magnetic field 600. The first magnetic field 600 contains flux lines 602 parallel to the container 502. The particles 518 in the MR fluid 516 will align with the flux lines 602 to create a parallel arrangement of particles 518. Referring back to FIG. 5B, the magnetic field influences the particles 518 to align in the direction of the flux lines 602. The particles 518 form a plurality of chains 524 that conductively couple the first conductive element 504 to the second conductive element 506. By conductively coupling the first conductive element 504 to the second conductive element 506, heat may be transferred through the temperature control device 500. The direction of heat transfer is illustrated by line 526. Because only moderate current has been provided to the electromagnet 508, a plurality of particles 518 remain scattered in the MR fluid 516. Thus, the rate at which heat is transferred in FIG. 5B is not at its maximum.

Figure 5C:
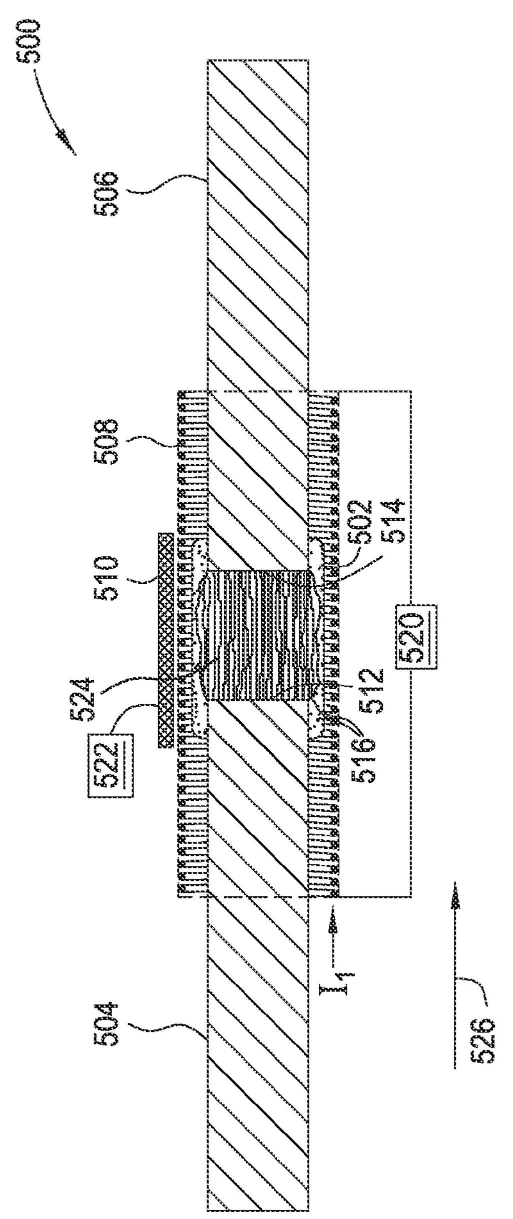

FIG. 5C illustrates the temperature control device 500, according to one embodiment. In FIG. 5C, maximum current is provided to the electromagnet 508 by the first power source 520. The maximum current increases the strength of the magnetic field about the container 502. The number of chains 524 of particles 518 formed in the MR fluid 516 is at its maximum, and the number of particles 518 that remain scattered are minimized. The increased number of chains 524 increases the conductive coupling between the first conductive element 504 and the second conductive element 506. At maximum current, heat transfer through the temperature control device 500 is at its greatest.

Figure 5D:
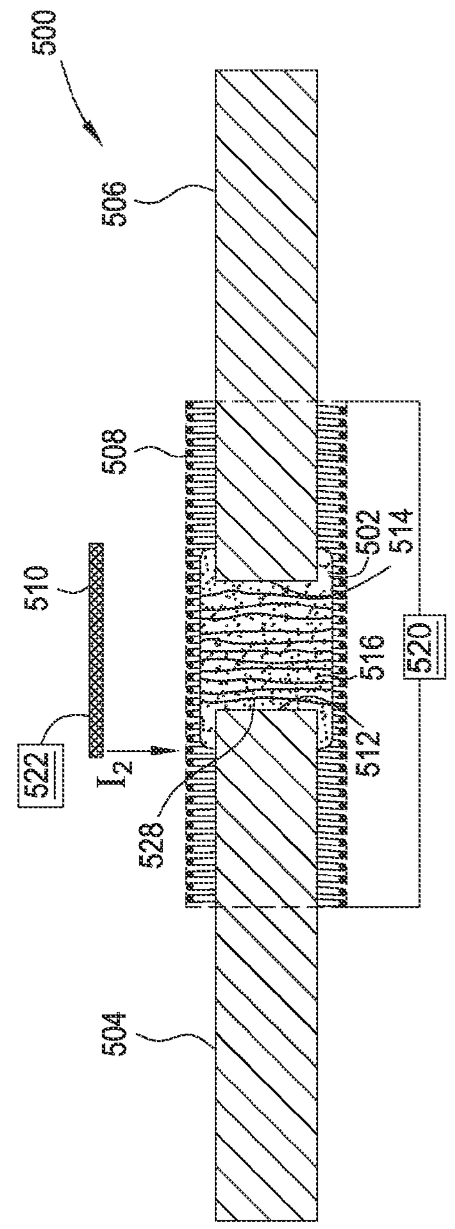

FIG. 5D illustrates the temperature control device 500, according to one embodiment. The controller 520 reduces the current provided to the electromagnet 508 to decrease the rate of heat transfer through the temperature control device 100. To reduce alignment of the particles 518 in the MR fluid 516, the controller 520 reduces the current I1 in conjunction with providing a current I2 to the second electromagnet 510. The controller 520 provides the current I2 to the second electromagnet 510 to generate a magnetic field substantially perpendicular to the magnetic field generated by the electromagnet.

FIG. 6 illustrates an enlarged view of the container 502 with both the first and second magnetic fields provided through the container 502. The second magnetic field 604 contains magnetic flux lines 606. The magnetic flux lines 606 are substantially perpendicular to the magnetic flux lines 602.

Referring back to FIG. 5D, the current I2 may be pulsed to the second electromagnet 510 during a gap in the current I1 provided to the electromagnet 508. Pulsing the current I2 forces some or most of the particles 518 in the MR fluid 516 out of alignment from the chains 524. The decrease in current I1 provided to the electromagnet 508 continues to move the particles 518 to a lesser state of alignment. When the current I1 provided to the electromagnet 508 is zero, the particles 518 in the MR fluid 516 will align with the magnetic flux lines 606, to form chains 528. The chains 528 conductively uncouple the first conductive element 504 from the second conductive element 506. Heat transfer through the temperature control device 500 is thus decreased. For example, heat transfer through the temperature control device 500 may be reduced by 50%.

Figure 7:
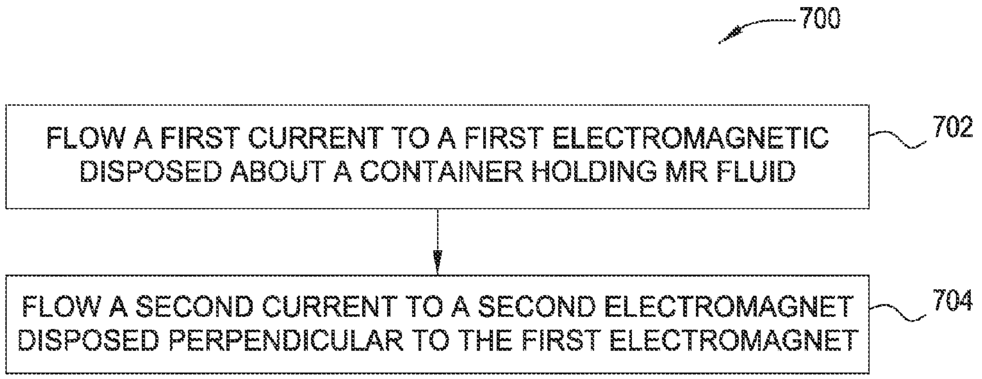
FIG. 7 illustrates a method of controlling temperature using the temperature control device of FIGS. 5A-5D, according to one embodiment.

FIG. 7 illustrates a method 700 of controlling heat transfer through a temperature control device, such as the temperature control device 500 as illustrated in FIGS. 5A-5D. The method 700 begins at block 702. At block 702, the controller provides a first current to an electromagnet. The electromagnet is disposed about a container holding MR fluid. The electromagnet generates a magnetic field about the container. A first conductive element is positioned on a first end of the container. A second conductive element is positioned on a second end of the container. When the magnetic field is generated, magnetic particles in the MR fluid align themselves with the magnetic flux lines of the magnetic field. The alignment of the particles in the MR fluid creates a plurality of chains. The plurality of chains in the MR fluid conductively coupled the first conductive element to the second conductive element. As such, heat may be transferred through the temperature control device. The amount of heat transfer may be controlled by adjusting the current provided to the electromagnet.

At block 704, the controller provides a second current to a second electromagnet. The second electromagnet is disposed perpendicular to the first electromagnet. The second electromagnet generates a second magnetic field. The second magnetic field is perpendicular to the first magnetic field. To reduce the amount of heat transfer through the temperature control device, the second current is pulsed to the second electromagnet during a gap in the first current provided to the first electromagnet. The pulsing of the current forces most of the particles in the plurality of chains out of alignment. The first current provided to the first electromagnet is decreased to continue to move the particles to a lesser state of alignment. The first conductive element is conductively uncoupled from the second conductive element when the first current goes to zero, and the plurality of particles for a plurality of horizontal chains, aligning with the magnetic flux lines of the second magnetic field.

Blocks 702-704 may be repeated to vary the amount of heat transferred through the temperature control device.

EXAMPLE

An example using the temperature control device 100 of FIGS. 1A-1C is disclosed herein. The temperature control device is used to control the heat transfer between a central processing unit (CPU) heat sink connected to a heat sink on a Peripheral Component Interconnect Express (PCIe). The temperature control device may be connected between the CPU heat sink and the PCIe. When the CPU is being used at full capacity and the PCIe is not being used, the full volume of the heat sink connected to the PCIe is not being used. It is desirable for the CPU to use the extra surface area of the PCIe heat sink while the PCIe is not being used.

The temperature control device allows the CPU to use the extra surface area of the PCIe heat sink by transferring heat from the CPU heat sink to the PCIe heat sink. For example, the CPU heat sink may be coupled to the third conductive element of the temperature control device and the PCIe heat sink may be connected to the fourth conductive element of the temperature control device. When it is desirable to use the extra surface area of PCIe heat sink, the first power source provides a first current to the electromagnet. The electromagnet then generates a magnetic field, which influences the first and second biasing elements to bias the first and second conductive elements towards the first and second ends of the container holding MR fluid. The particles in the MR fluid align with the magnetic flux lines of the magnetic field to form chains of particles. The chains conductively couple the first conductive element to the second conductive element so that heat may transfer through the temperature control device. Thus, the heat generated by the CPU can be transferred to the PCIe heat sink to utilize the extra surface area of the PCIe heat sink.

When the PCIe card usage is increased, the amount of heat transferred from the CPU to the PCIe heat sink may be decreased. To decrease the amount of heat transferred, the current provided to the electromagnet may be reduced to decrease the number of chains of particles formed in the MR fluid and to expand the container of MR fluid. By alternating between increasing and decreasing the current provided to the electromagnet, the user may more effectively control the heat transfer from both the CPU heat sink to the PCIe heat sink and back from the PCIe heat sink to the CPU heat sink.

While the foregoing is directed to embodiments of the present invention, other and further embodiments of the invention may be devised without departing from the basic scope thereof, and the scope thereof is determined by the claims that follow.

What is claimed is:

1. A method of controlling heat transfer, the method comprising:

providing a first current through a first electromagnet disposed about a container holding magnetorheological fluid to generate a first magnetic field such that particles in the magnetorheological fluid align with the first magnetic field to conductively couple a first conductive element to a second conductive element; and providing a second current through a second electromagnet disposed perpendicular to the first electromagnet to generate a second magnetic field perpendicular to the first magnetic field such that the particles in the magnetorheological fluid align with the second magnetic field to conductively uncouple the first conductive element from the second conductive element.

2. The method of claim 1, wherein controlling the first current provided to the first electromagnet controls an amount of heat transferred.

3. The method of claim 1, wherein the first current is reduced in combination with providing the second current through the second electromagnet to conductively uncouple the first conductive element from the second conductive element.

4. The method of claim 3, wherein the first current is reduced to zero.

5. The method of claim 1, wherein providing the second current though the second electromagnet aligns the particles with a direction of the second magnetic field.

6. The method of claim 1, wherein providing the first current through the first electromagnet aligns the particles in a parallel arrangement.

7. The method of claim 1, wherein providing a second current through a second electromagnet comprises:

pulsing the second current during an interruption in the first current provided to the first electromagnet.

* * * * *